UNITED STATES PATENT OFFICE.

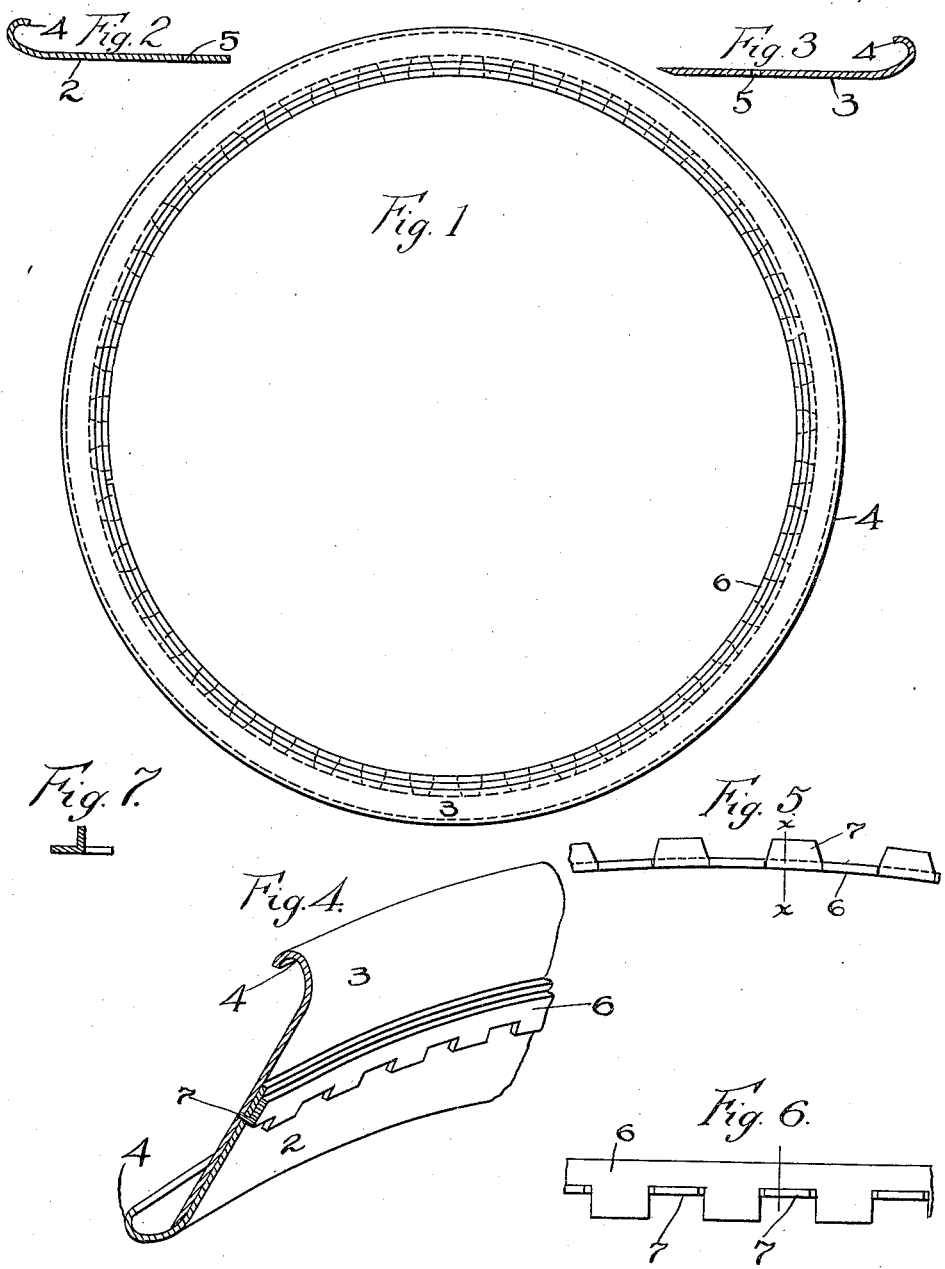

ALBERT R. BEHNKE, OF ST. PAUL, MINNESOTA.

REMOVABLE RIM.

1,133,835.  Specification of Letters Patent.  Patented Mar. 30, 1915.

Application filed May 18, 1912. Serial No. 698,284.

*To all whom it may concern:*

Be it known that I, ALBERT R. BEHNKE, a citizen of the United States, residing at St. Paul, in the county of Ramsey and State of Minnesota, have invented certain new and useful Improvements in Removable Rims, of which the following is a specification.

My invention relates to improvements in tire carrying rims, its object being to provide a longitudinally split removable tire carrying rim with improved means for locking the sections together, whereby the sections may be quickly and easily locked together or disconnected from each other to permit a pneumatic tire being quickly supported upon or removed from the rim.

My improved rim with a supported tire may be secured upon a wheel by the ordinary fastening devices.

To this end the invention consists in the features of construction, combination, and arrangement of parts hereinafter described and claimed.

In the accompanying drawings forming part of this specification, Figure 1 is a side view of a rim embodying my features of invention; Figs. 2 and 3 are sectional views through the rim sections; Fig. 4 is a detail view of my improved rim shown broken away and sectioned; Figs. 5 and 6 are side and top views, broken away, of a locking ring forming part of the invention; and Fig. 7 is a section on line $x$—$x$ of Fig. 5.

Referring to the drawings, 2 and 3 represent annular clencher rim sections which, as shown in Fig. 4, overlap to form a clencher rim of the ordinary type having curved edges 4 to receive the tire flanges. The underlapping section 3 preferably overlaps the entire inner face of the section 2 to constitute a smooth bearing surface for the casing and tube. The rim sections are formed with a plurality of openings 5, which openings register when the sections are placed in overlapping position.

For the purpose of locking together the rim sections I provide the spring ring 6 having unconnected ends whereby it may be sprung to fit tightly inside the rim. The ring is formed with a plurality of outwardly bent tapered lugs 7 spaced a distance apart equal to the spacing apart of the slots 5.

In use, with the sections of the clencher rim placed over the side beads of the tire and brought together into the position shown in Fig. 4, the locking ring is inserted inside the rim with the lugs 7 positioned opposite the slots 5 and the ring then allowed to expand to allow the lugs to extend outwardly through the slots, holding the rim sections together. The tapering of the lugs facilitates their entry into the slots, the lugs being in length equal to the combined thickness of the two sections of the rim, so as to project through the registering slots in both without projecting beyond the inner rim sections to injure the tire. With the sections of the rim 6 thus secured together the rim with the supported tire may be arranged upon the felly of the wheel and secured thereon in the usual manner.

By means of my invention I am enabled to carry an inflated tire upon the rim ready for placing upon a wheel, and to support a tire upon the rim and to remove the same therefrom with particular ease and quickness.

I claim as my invention:

The combination with a two part tire rim separated circumferentially, the rim parts being constructed to centrally overlap and formed in their overlapping portions with corresponding interspaced openings, of a spring ring inwardly formed with a flat portion and with lugs bent at right angles from said flat portion, said lugs being interspaced and tapered toward their free ends to extend through said openings and draw said rim parts together.

In testimony whereof I affix my signature in presence of two witnesses.

ALBERT R. BEHNKE.

Witnesses:
H. S. JOHNSON,
H. SMITH.

Copies of this patent may be obtained for five cents each, by addressing the "Commissioner of Patents, Washington, D. C."